United States Patent [19]
Nuti

[11] Patent Number: 5,271,372
[45] Date of Patent: Dec. 21, 1993

[54] CYLINDER HEAD FOR INTERNAL COMBUSTION ENGINES, WITH A DEVICE FOR PNEUMATICALLY ASSISTED DIRECT FUEL INJECTION

[75] Inventor: Marco Nuti, Pisa, Italy
[73] Assignee: Piaggio Veicoli Europei S.p.A., Italy
[21] Appl. No.: 977,514
[22] Filed: May 19, 1992
[30] Foreign Application Priority Data
  May 20, 1991 [IT] Italy ............... MI91 A 111372
[51] Int. Cl.$^5$ ............................................. F02M 67/02
[52] U.S. Cl. ........................................................ 123/533
[58] Field of Search ............................... 123/531, 533

[56] References Cited
U.S. PATENT DOCUMENTS

| | | | |
|---|---|---|---|
| 2,453,377 | 11/1948 | Lozivit | 123/446 |
| 2,710,600 | 6/1955 | Nallinger | 123/533 |
| 4,149,497 | 4/1979 | Zeliszkewycz | 123/533 |
| 4,170,205 | 10/1979 | Fiedler | 123/533 |
| 4,674,462 | 6/1987 | Koch et al. | 123/533 |
| 4,781,164 | 11/1988 | Seeber et al. | 123/533 |
| 5,016,597 | 5/1991 | Borst | 123/533 |
| 5,054,457 | 10/1991 | Sakamoto | 123/533 |
| 5,131,375 | 7/1992 | Sakamoto | 123/533 |

FOREIGN PATENT DOCUMENTS

| | | |
|---|---|---|
| 0030832 | 6/1981 | European Pat. Off. . |
| 0223435 | 5/1987 | European Pat. Off. . |
| 0246370 | 11/1987 | European Pat. Off. . |
| 0929221 | 6/1946 | France . |

*Primary Examiner*—Willis R. Wolfe
*Attorney, Agent, or Firm*—Diller, Ramik & Wight

[57] ABSTRACT

A cylinder head for internal combustion engines, with a device for the pneumatically assisted direct injection of fuel into at least one cylinder provided with at least one spark plug and a valve aperture with its relative valve, fuel feed means being provided, the valve being connected to a chamber into which said feed means cause the fuel to flow. The chamber is connected to a feed duct directly associated with an air pipe and an oil pipe, a piston acting within the chamber in order, during its compression stroke, to inject the air-fuel mixture generated in the chamber into at least one cylinder via the valve aperture, the piston being operated mechanically by a positive transmission driven by the crankshaft.

14 Claims, 2 Drawing Sheets

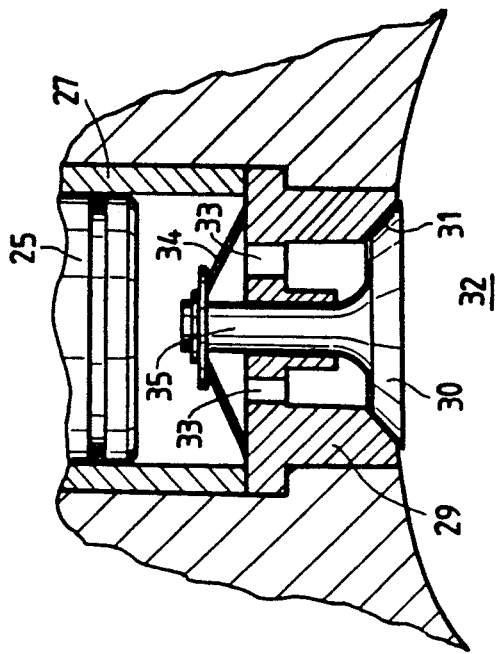
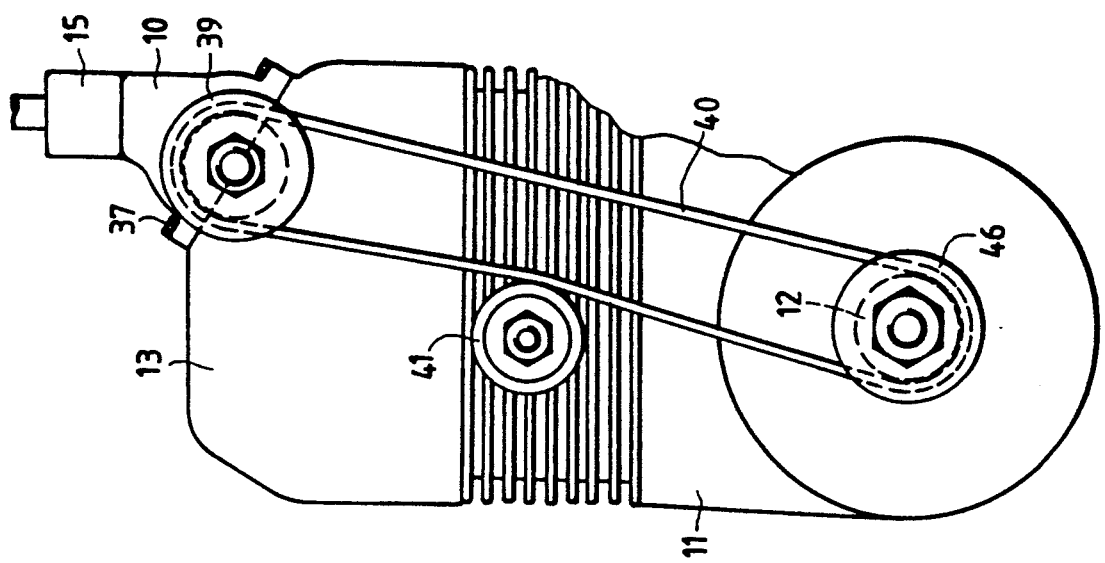

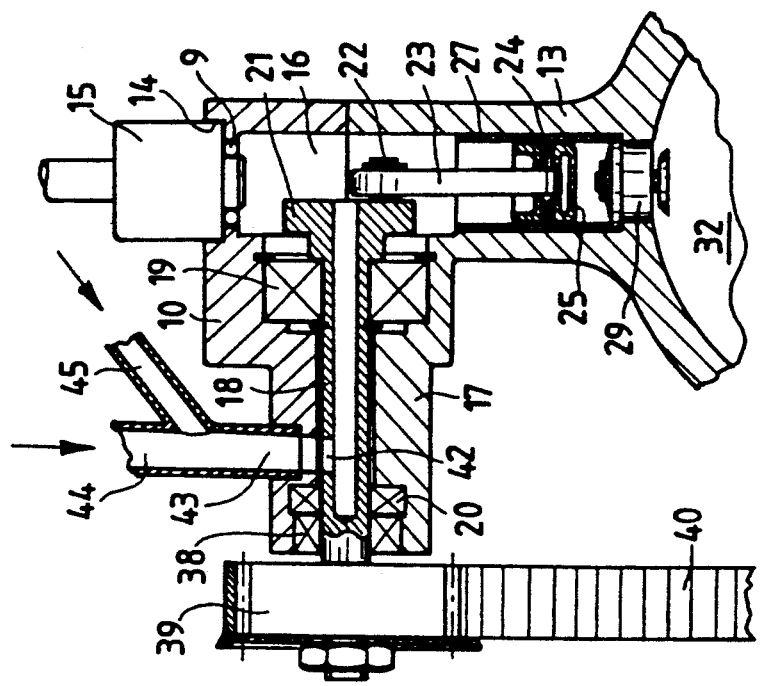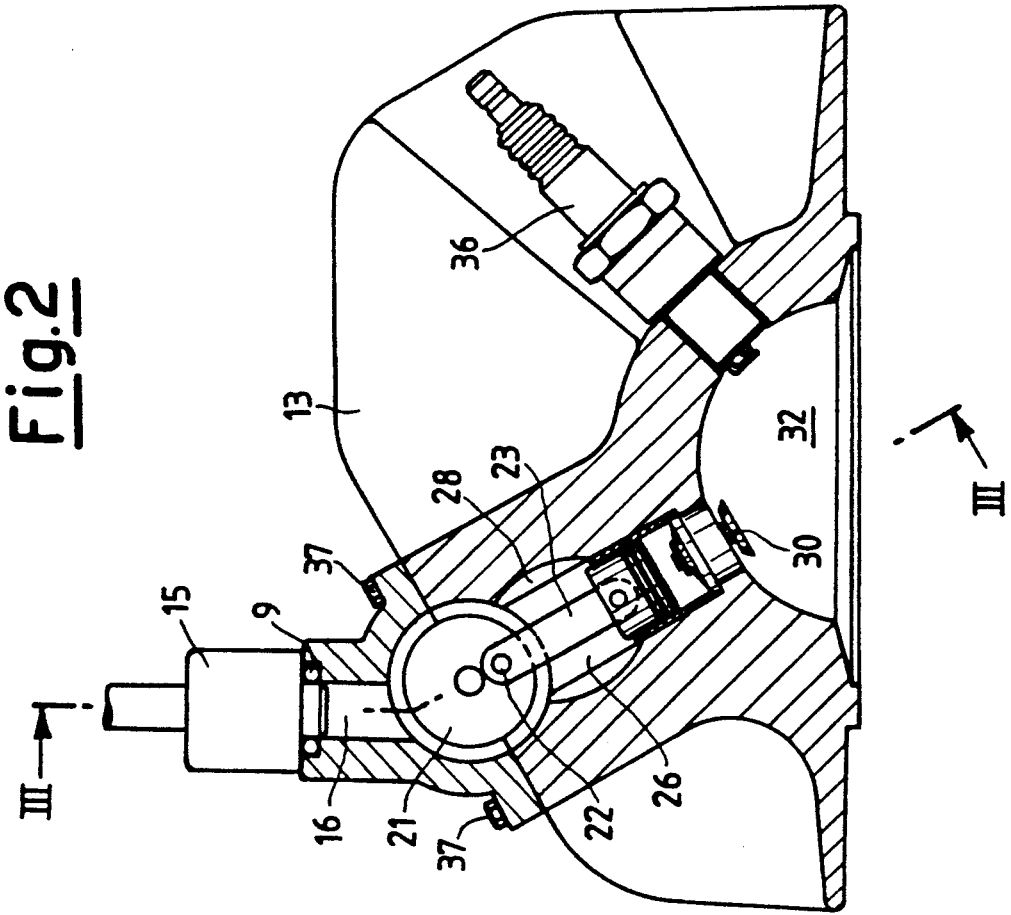

CYLINDER HEAD FOR INTERNAL COMBUSTION ENGINES, WITH A DEVICE FOR PNEUMATICALLY ASSISTED DIRECT FUEL INJECTION

This invention relates to a cylinder head for internal combustion engines, with a device for pneumatically assisted direct fuel injection.

Various methods are currently known for pneumatically assisted fuel injection into the cylinder head of an internal combustion engine.

In some of these methods the compressed air is generated by appropriate devices external to the engine, the fuel being injected into an appropriate chamber and the resultant mixture formed therein being then fed to the combustion chamber by opening valves located on the engine cylinder head.

These various known methods can be divided into two main types, i.e. a first type using high pressure air and hence small cross-section valves of electromechanical operation, and a second type using low pressure air and large valves of totally mechanical operation. It should however be noted that both these main types have various drawbacks, especially in the case of small engines.

In this respect, the first of these types is structurally complex as compressed air has to be generated at high pressure. In addition the electronic valve control circuit is complicated because the moment of injection has to be controlled in addition to the opening times.

The said second type comprising mechanical valve operation suffers mainly from lubrication problems. In addition a compensation vessel must be provided to regularize the pressure difference between the crankcase and the injection valve. This involves additional cost and space requirements.

Methods are also known comprising a reciprocating pump positioned on the cylinder head of a four-stroke engine, which injects through a valve a carburated mixture prepared externally to the pump by a rather complex carburation device.

The object of the present invention is mainly to solve the aforesaid problems, for example by eliminating high pressure air, facilitating lubrication and reducing the controls and verifications required in the stated known methods.

This object is attained according to the present invention by a cylinder head for internal combustion engines, with a device for the pneumatically assisted direct injection of fuel into at least one cylinder provided with at least one spark plug and a valve aperture with its relative valve, fuel feed means being provided, characterised in that said valve is connected to a chamber into which said feed means cause the fuel to flow, said chamber being connected to a feed duct directly associated with an air pipe and an oil pipe, a piston acting within said chamber to inject the air-fuel mixture generated in said chamber into said at least one cylinder via the valve aperture, said piston being operated mechanically by a positive transmission driven by the crankshaft.

A cylinder head having the structural and operational characteristics and advantages of the present invention is shown by way of non-limiting example on the accompanying drawings, in which:

FIG. 1 is a side elevational view of a cylinder head according to the present invention applied to a cylinder of an internal combustion engine;

FIG. 2 is a cross-section through the reversed upper part of FIG. 1, i.e. through the actual cylinder head of the invention;

FIG. 3 is a partial cross-section through the cylinder head of FIG. 1 taken on the line III—III of FIG. 2; and FIG. 4 is an enlarged detail of FIG. 3.

In FIG. 1, the reference numeral 11 indicates a cylinder of an internal combustion engine with its crankshaft 12 and cylinder head 13.

The head of the cylinder 13 extends upwardly into a removable portion 10 housed in a seat 14 formed at the top of the head and provided with a gasket or seal ring 9, and an electromagnetic fuel injector indicated schematically by 15 and representing a fuel feed means. The injector 15 faces an inner chamber 16. In a portion 17 projecting both from said cylinder head 13 and from said removable portion 10 and laterally to said chamber 16 there is provided a hollow shaft 18 rotatably supported on bearings 19 and 20. A first flanged end 21 of the hollow shaft 18 faces said chamber 16 and is rotationally pivoted eccentrically by a pin 22 to a first end of a connecting rod 23, the other end of which is pivoted at 24 to an injection piston 25 which during its compression stage injects the air-fuel mixture formed in the chamber 16.

The injection piston 25 is slidable within a lower extension 26 of the chamber 16, the walls of which are delimited by a jacket 27 with outwardly convex lateral portions 28. Alternatively, those parts of said lower extension 26 upstream and downstream of the piston 25 can be connected together by at least one transfer duct provided in the cylinder head 10.

That end of the jacket 27 facing outwards is positioned at a valve seat 29 housing a movable mushroom valve 30 arranged to abut against and hence close a lower aperture 31 in the valve seat 29 connecting to a combustion chamber 32, partly shown, which is faced by a spark plug 36. The valve seat 29 is upperly connected to the lower extension 26 of the chamber 16 by a series of holes 33. The mushroom valve 30 is retained in its closure rest position by a spoked cup spring 34 rigid with the valve stem 35. The removable portion 10 is fixed to the cylinder head 13 for example by a plurality of bolts 37, a gasket or seal ring 38 being provided at the bearing 20 on the hollow shaft 18 at the outwardly facing end. On an extension projecting outwards from the cylinder head 13, the shaft rigidly carries a pulley 39 rotated by a toothed belt 40 tensioned by a tensioning roller 41 and driven by a second pulley 46 rigid eith the crankshaft 12. The bearing 20 can alternatively consist of a bush (not shown).

In the cylinder head of the present invention the hollow shaft 18 comprises a hole or radial aperture 42 arranged to face an inlet duct 43 which is connected to an air pipe 44 and an oil pipe 45. The injection piston 25 within the inner chamber 16 in which the injector 15 is provided allows direct fuel injection, pneumatically assisted by the air fed via the inlet duct 43 to the interior of the underlying cylinder 32.

The operation of a cylinder head according to the present invention is as follows.

Air from the pipe 44 and oil from the pipe 45 are fed into the hollow shaft 18 via the inlet duct 43, the oil being in the minimum quantity required to maintain lubrication of the mechanical parts contained in the internal chamber 16. An electronic control circuit (not shown) operates the electromagnetic injector 15, to feed fuel into the internal chamber 16.

The mixture obtained in this manner is compressed by the injection piston 25 after it has passed via the convex lateral portions 28 into the lower portion of the chamber 16. When the pressure produced between the injection piston 25 and the valve seat 29 has overcome the elastic force of the spoke spring 34, it lowers the mushroom valve 30 to consequently inject the mixture into the underlying combustion chamber 32.

It is immediately apparent that such an arrangement of the constituent parts of the engine cylinder head according to the invention does not require high pressure air to be fed into the internal chamber 16 by appropriate devices. This therefore eliminates particularly costly components and problems connected with the timing of the high pressure air feed and fuel feed through injectors or solenoid valves.

Feeding oil directly via the inlet duct 43 ensures the presence of sufficient lubricant for the correct operation of the constituent parts of the cylinder head, and in addition there is no need for a special vessel to compensate for any pressure differences.

The particularly simplified construction and operation of the cylinder head for internal combustion engines according to the present invention result in a substantial cost reduction, so making it particularly suitable and advantageous for two-stroke engines.

I claim:

1. A cylinder head for internal combustion engines including a device for the pneumatically assisted direct injection of fuel into at least one cylinder provided with at least one spark plug and a valve aperture with its relative valve aperture with its relative valve, fuel feed means being provided, characterised in that said valve is connected to a chamber into which said feed means cause the fuel to flow, said chamber being connected to a feed duct directly associated with an air pipe and an oil pipe, a piston acting within said chamber to inject the air-fuel mixture generated in said chamber into said at least one cylinder via the valve aperture, said piston being operated mechanically by a positive transmission driven by the crankshaft, said feed duct is defined at least partially by a hollow shaft rotatably supported within said chamber and rotated by said positive transmission, at an end facing the interior of said chamber there being pivoted eccentrically to it one end of a connecting rod, and the other end thereof being pivoted to said piston.

2. An engine cylinder head as claimed in claim 1, wherein said fuel feed means comprises at least one injector positioned in a seat provided in said cylinder head, and 3. An engine cylinder head as claimed in claim 1, characterised in that on that rotatably supported portion thereof facing away from said cylinder head, said shaft is provided with a seal gasket.

4. An engine cylinder head as claimed in claim 1, characterised in that said hollow shaft extends outward from said cylinder head to support a pulley driven by a toothed belt rotated by a second pulley rigid with said crankshaft.

5. An engine cylinder head as claimed in claim 4, wherein said fuel feed means comprise at least one injector positioned in a seat provided in said cylinder head, and with a seal gasket therebetween.

6. An engine cylinder head as claimed in claim 4 wherein said piston is slidable within a lower extension of said chamber delimited by a jacket, and those parts of said extension upstream and downstream of said piston communicating via at least one duct.

7. An engine cylinder head as claimed in claim 1, characterised in that said valve supported in said valve aperture is a mushroom valve slidingly guided within a valve and an elastic element being provided which when under rest conditions maintains said valve in the position which closes said valve aperture.

8. An engine cylinder head as claimed in claim 7, characterised in that said valve seat is provided with a lower aperture against which the mushroom end of said valve abuts, and comprises a series of holes in its upper end, through this latter a stem being slidingly guided.

9. An engine cylinder head as claimed in claim 7, characterised in that said elastic element is a spoked cup spring.

10. A cylinder head for internal combustion engines including a device for the pneumatically assisted direct injection of fuel into at least one cylinder provided with at least one spark plug and a valve aperture with its relative valve aperture with its relative valve, fuel feed means being provided, characterised in that said valve is connected to a chamber into which said feed means cause the fuel to flow, said chamber being connected to a feed duct directly associated with an air pipe and an oil pipe, a piston acting within said chamber to inject the air-fuel mixture generated in said chamber into said at least one cylinder via the valve aperture, said piston being operated mechanically by a positive transmission driven by the crankshaft, said piston is slidable within a lower extension of said chamber delimited by a jacket, and those parts of said extension upstream and downstream of said piston communicating via at least one duct.

11. An engine cylinder head as claimed in claim 10, characterised in that said at least one duct is an outwardly convex lateral portion in said jacket.

12. An engine cylinder head as claimed in claim 10, characterised in that said valve supported in said valve aperture is a mushroom valve slidingly guided within a valve seat, and an elastic element being provided which when under rest conditions maintains said valve in the position which closes said valve aperture.

13. An engine cylinder head as claimed in claim 10, wherein said feed duct is defined at least partially by a hollow shaft rotatably supported within said chamber and rotated by said positive traction, at an end facing the interior of said chamber there being pivoted eccentrically to it one end of a connecting rod, and the other end thereof being pivoted to said piston.

14. An engine cylinder head as claimed in claim 13, characterised in that said hollow shaft extends outward from said cylinder head to support a pulley driven by a toothed belt rotated by a second pulley rigid with said crankshaft.

* * * * *

UNITED STATES PATENT AND TRADEMARK OFFICE
CERTIFICATE OF CORRECTION

PATENT NO. : 5,271,372
DATED : December 21, 1993
INVENTOR(S) : Marco NUTI

It is certified that error appears in the above-identified patent and that said Letters Patent is hereby corrected as shown below:

On the title page, Item [30]: "Foreign Application Priority Data, please correct this information as follows:

"May 20, 1991 [IT]   Italy.......... MI91 A 111372"

should correctly read:
-- May 20, 1991 [IT]   Italy.......... MI 91 A 001372 --.

Signed and Sealed this

Sixteenth Day of August, 1994

Attest:

BRUCE LEHMAN

*Attesting Officer*      *Commissioner of Patents and Trademarks*